United States Patent
Dinter et al.

(10) Patent No.: US 9,151,860 B2
(45) Date of Patent: Oct. 6, 2015

(54) TOWED ARRAY SONAR SYSTEM AND METHOD FOR CARRYING OUT A SONAR MISSION WITH SUCH A TOWED ARRAY SONAR SYSTEM

(75) Inventors: Jens-Heiko Dinter, Syke (DE); Uwe Fass, Bremen (DE)

(73) Assignee: ATLAS ELEKTRONIK GMBH, Bremen (DE)

( * ) Notice: Subject to any disclaimer, the term of this patent is extended or adjusted under 35 U.S.C. 154(b) by 758 days.

(21) Appl. No.: 13/403,327

(22) Filed: Feb. 23, 2012

(65) Prior Publication Data

US 2012/0218865 A1 Aug. 30, 2012

(30) Foreign Application Priority Data

Feb. 25, 2011 (DE) .......................... 10 2011 000 948

(51) Int. Cl.
*G01V 1/38* (2006.01)
(52) U.S. Cl.
CPC .................... *G01V 1/3843* (2013.01)
(58) Field of Classification Search
CPC ....... G01V 1/38; G01V 1/3843; H04B 11/00; G01S 15/00; F16L 1/12
USPC ......................................................... 405/163
See application file for complete search history.

(56) References Cited

U.S. PATENT DOCUMENTS

| | | | |
|---|---|---|---|
| 3,093,333 A | 6/1963 | Bishop | |
| 4,010,619 A * | 3/1977 | Hightower et al. | 405/191 |
| 5,080,530 A | 1/1992 | Crawford et al. | |
| 5,902,072 A | 5/1999 | Berges | |
| 2007/0291587 A1 * | 12/2007 | Gros | 367/16 |
| 2008/0267009 A1 | 10/2008 | Frivik et al. | |
| 2010/0064955 A1 | 3/2010 | Coupeaud et al. | |
| 2010/0074048 A1 | 3/2010 | Furuhaug | |

FOREIGN PATENT DOCUMENTS

| | | |
|---|---|---|
| DE | 10 2009 019 556 A1 | 11/2010 |
| SG | 175231 A1 | 11/2011 |
| SG | 2011075132 A1 | 11/2011 |

OTHER PUBLICATIONS

European Office Action dated Jun. 6, 2012 regarding European Application No. 12156500.6.

* cited by examiner

*Primary Examiner* — Luke Ratcliffe
*Assistant Examiner* — Hovhannes Baghdasaryan
(74) *Attorney, Agent, or Firm* — Fitch, Even Tabin & Flannery LLP

(57) ABSTRACT

A towed array sonar system 10 with a towed array 14, a deployment device 32 for respectively deploying and retrieving the towed array 14 into and from a body of water, a signal processing device 28 for processing the signals of the towed array 14 and at least one control console 30 for controlling the towed array sonar system 10. In order to create a mobile sonar system that can be deployed independently of a ship, the towed array 14, the deployment device 32, the signal processing device 28 and the control console 30 are installed in a container 12 that can be transported independently of a ship. The invention furthermore pertains to a method for carrying out a sonar mission using such a towed array sonar system 10.

14 Claims, 2 Drawing Sheets

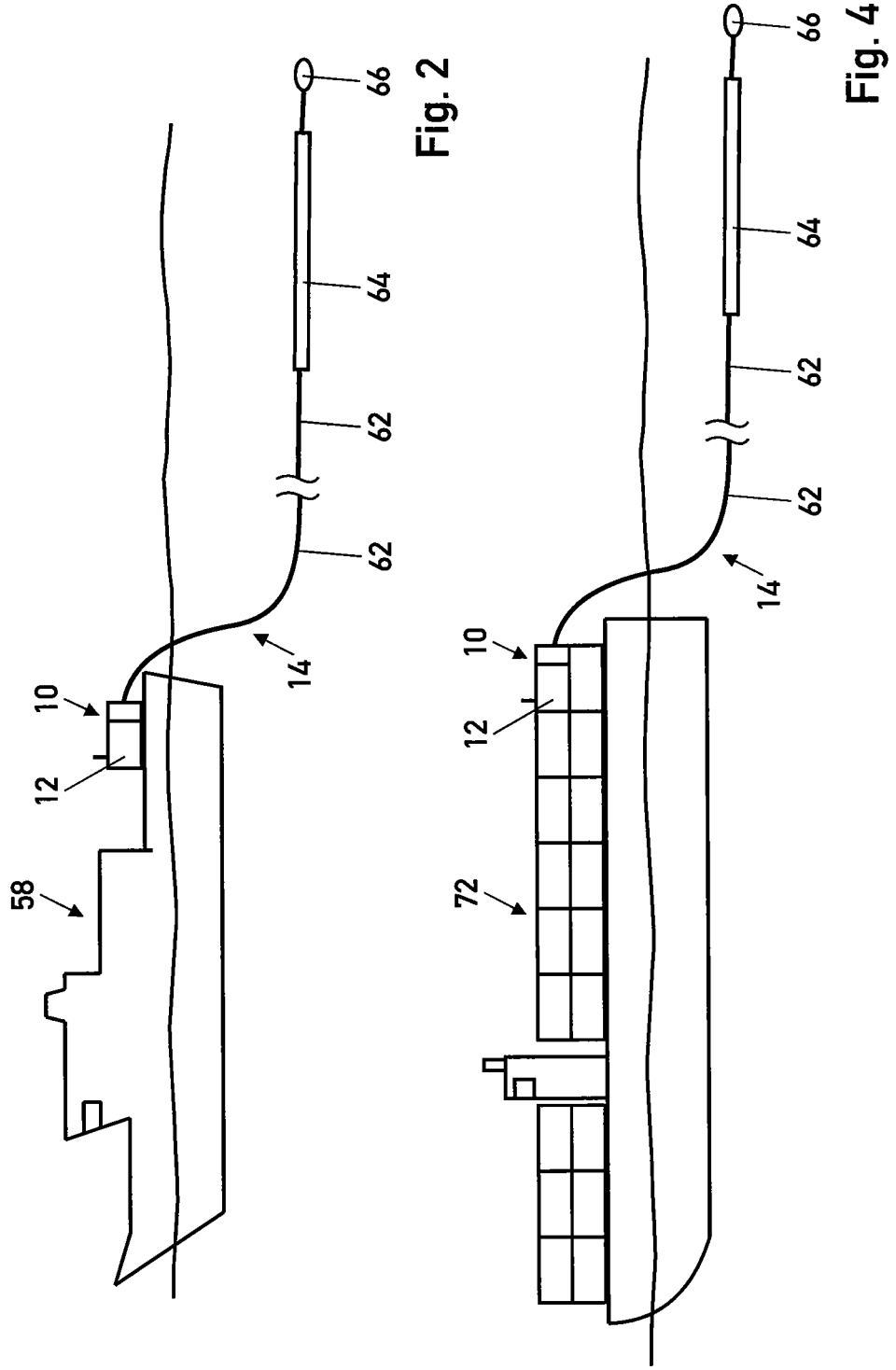

TOWED ARRAY SONAR SYSTEM AND METHOD FOR CARRYING OUT A SONAR MISSION WITH SUCH A TOWED ARRAY SONAR SYSTEM

CROSS-REFERENCE TO RELATED APPLICATIONS

The present application claims the priority of German Patent Application No. 10 2011 000 948.5-55, filed Feb. 25, 2011, the subject matter of which, in its entirety is incorporated herein by reference.

BACKGROUND OF THE INVENTION

The invention pertains to a towed array sonar system with a towed array, a deployment device for respectively deploying and retrieving the towed array into and from a body of water, a signal processing device for processing the signals of the towed array and at least one control console for controlling the towed array sonar system. The present invention additionally pertains to a method for carrying out a sonar mission with such a towed array sonar system.

Conventional towed array sonar systems have a towed array that consists, in particular, of a towing cable, as well as an acoustically active section with hydrophones or electroacoustic transducers and, if applicable, an end section for stabilizing the position and alignment of the towed array in the water. On surface ships, such towed arrays are installed at the stern of the ship and deployed into the surrounding body of water, as well as subsequently retrieved, by means of a winch that is mounted at the stern for this purpose US 2010/0064955 A1 discloses a deployment system with such a winch that serves for deploying a towed array and a submersible floating body into a body of water and for retrieving the towed array and the submersible floating body from the body of water. In addition to the deployment into the body of water and the retrieval from the body of water, the deployment system is also designed for automatically connecting the submersible floating body to the towing cable of the towed array during the deployment and for once again separating the submersible floating body during the retrieval. In this case, the submersible floating body corresponds to a so-called sonar fish finder that actively emits sound waves. The emitted sound waves are then recorded with the acoustically active section of the towed array, e.g., after they were reflected on the bottom of the body of water, and sonar data is determined from the recorded sound waves aboard the ship.

DE 10 2009 019 556 A1 discloses another deployment system that allows the land-based deployment of an underwater vehicle.

A signal processing device that is connected to the towed array and processes the obtained sonar data in order to provide a situation report on other watercraft is arranged aboard a ship with a deployment system for deploying towed arrays. Consequently, at least one control console for operating and controlling the towed array sonar system, as well as for mapping the determined position, is arranged aboard the ship. However, the control of the towed array sonar system and the mapping of the position may, if applicable, also be realized on different consoles.

The winches for deploying such towed arrays require a relatively large space that usually needs to be provided at the stern of the ship.

However, since towed array sonars of this type are not used permanently, but usually only in special threat situations or for training purposes, the space at the stern, in which the winch is installed, frequently is unnecessarily blocked. This significantly increases the overall costs for the provision of towed array sonar systems and consequently reduces the cost-efficiency of towed array sonar systems.

In light of the above-described circumstances, the invention therefore is based on the objective of realizing towed array sonar systems more efficiently.

SUMMARY OF THE INVENTION

According to the invention, the above objective is attained, according to a first aspect of the invention, by a towed array sonar system with a towed array, a deployment device for respectively deploying and retrieving the towed array into and from a body of water, a signal processing device for processing the signals of the towed array and at least one control console for controlling the towed array sonar system, wherein the towed array, the deployment device, the signal processing device and the control console are installed in a container that can be transported independently of a ship.

The above objective is attained according to a second aspect of the invention by a method for carrying out a sonar mission utilizing the towed array sonar system according to the invention.

An inventive towed array sonar system consequently is equipped with a towed array, a deployment device, particularly a winch, for respectively deploying and retrieving the towed array into and from a body of water such as an ocean, a semi-enclosed sea, a lake, a river or a mouth of a river, a signal processing device for processing the signals of the towed array and at least one control console for controlling the towed array sonar system, wherein the towed array, the deployment device, the signal processing device and the control console are installed in a container that can be transported independently of a ship.

The inventive method for carrying out a sonar mission utilizes such a towed array sonar system and comprises the following steps:
 a) transporting the towed array sonar system to an operating site,
 b) opening a door of the container,
 c) deploying the towed array from the container into a body of water through the opened door by means of the deployment device,
 d) controlling a sonar mission by means of the control console within the container,
 e) retrieving the towed array from the body of water into the container after the completion of the sonar mission, and
 f) subsequently closing the door.

The invention therefore provides a mobile sonar system that can be deployed independently of a ship. Consequently, the invention makes it possible to clear the space aboard a ship that is otherwise blocked by the winch of a towed array sonar system when the towed array sonar system is not needed. The invention furthermore makes it possible to use a single towed array sonar system on a plurality of ships or floating platforms or landward sites, e.g., in order to protect harbor facilities. The aforementioned container therefore can preferably be closed on all sides and is waterproof, wherein the container serves for protecting the towed array, as well as the entire towed array sonar system, from environmental influences and the wash of the sea during its transport.

According to a special embodiment, the towed array sonar system is transported to a new operating site or a storage site after a sonar mission has been carried out. This is advantageous because threatened sea areas can be effectively monitored with only one or a few towed array sonar systems in that one and the same towed array sonar system repeatedly passes through the sea area in question and therefore makes it possible to comprehensively monitor a sea area with little effort in an essentially continuous fashion. The inventive mobile towed array sonar system consequently also provides cost-effective protection against pirates, e.g., in that sea areas particularly affected by pirate assaults are monitored with only one or a few inventive mobile towed array sonar systems. Since such towed array sonar systems are accommodated in a container, they can be transferred from one ship to another ship without any difficulty. Such a transfer of a single container can be realized very quickly and therefore is much less time-consuming than equipping a ship with a stationary towed array sonar system.

In a special embodiment, the operating site is a location on or below deck at the stern of a ship. The container is preferably placed and lashed down on a helicopter deck that is frequently situated at the stern of a ship. On a container ship, however, the container may also be accommodated at the stern end such that direct access to the surrounding body of water is ensured. The container may furthermore be accommodated below deck as long as an opening is provided in the hull of the accommodating ship at the height of the container.

In another special embodiment, the operating site is a harbor facility. For example, the container of the towed array sonar system can be placed on a quay wall of a harbor facility and the towed array can be installed in the region of the bottom of the harbor facility. A thusly installed sonar system serves for protecting and monitoring harbor facilities.

In a special embodiment, the towed array therefore is realized heavier than water. Consequently, it is possible to deposit the towed array on the bottom of a body of water or ocean without requiring a special antenna mounting.

In another special embodiment, at least an acoustically active section of the towed array is provided with means for attaching anchoring devices that serve for anchoring this section on the bottom of a body of water on both of its ends. Consequently, a towed array with the specific weight of water or neutral buoyancy trim can also be anchored on the bottom of a body of water.

In another special embodiment, the container features a radio communication device, particularly a satellite communication device, for transmitting sonar data from the towed array sonar system to a command post outside the container and/or for receiving control data for the towed array sonar system from the command post.

In this case, the control console advantageously transmits sonar data to the command post outside the container and receives control data from this command post. The towed array sonar system therefore can be incorporated into a regionally distributed reconnaissance system with other sonar systems, radar systems, infrared detection systems and/or satellite systems. The sonar data generated by the towed array sonar system is advantageously transmitted to a central command post and/or to the command bridge of the ship in the form of a situation report.

In another special embodiment, the operating site is a ship and the sonar data is transmitted to another ship via radio. This serves, in particular, for protecting a corporation that preferably operates merchant vessels, wherein at least one ship is upgraded to a reconnaissance ship due to the accommodation of a container with the inventive towed array sonar system. Other ships of this corporation can receive the sonar data via radio. Consequently, each ship of a corporation can receive a situation report and draw its own conclusions with respect to the risk of a potential assault, e.g., by pirates and, if applicable, initiate suitable countermeasures.

According to another special embodiment, sonar data of other sonar systems, particularly other towed array sonar systems, radar data of radar systems and infrared detection data of infrared detection devices that are respectively arranged, in particular, aboard other ships and/or satellite monitoring data of satellite monitoring systems is transmitted to the control console via radio. This is advantageous because it is possible to realize a fusion of the sensor data of different sensors of different platforms or devices in order to enhance the situation report.

In a special embodiment, the container has an interior that is split into a control room and a winch compartment by means of a partition wall, wherein the control room is or can be hermetically sealed relative to the surroundings and contains the signal processing device and the control console. In this case, the winch compartment contains the deployment device that comprises a winch. Such a spatial separation between the mechanical engineering components, e.g., the winch, and the electronic components, e.g., the signal processing device, is advantageous because the usually sensitive electronic components therefore are accommodated in a climatically protected fashion. This also allows deployments under adverse environmental conditions, particularly at very low or very high temperatures and at a high relative humidity.

According to another advantageous embodiment, the control room features an access door, an emergency exit, a window to the winch compartment, an air-conditioning system, a heat insulation for thermally insulating the control room relative to the surroundings, a heating system, fire extinguishing means, first aid means, a satellite telephone system, communication devices for communicating with devices aboard the ship accommodating the container and/or with devices outside the ship, an emergency power supply, a satellite navigation system and/or an automatic identification system. Furthermore, other office equipment such as chairs and tables are advantageously provided in the control room. Consequently, the control room is a full-fledged control center with all devices required for the around-the-clock operation with personnel that is also able to very attentively operate the towed array sonar system over a period of many hours or days. These devices make it possible, in particular, to moderate extreme environmental conditions such as, e.g., very low or very high temperatures and a high relative humidity to a tolerable level wherever possible.

In another advantageous embodiment, the towed array sonar system features a voltage transformer that is installed in the container and provides a predefined or predefinable electric output voltage at a variable electric input voltage. This voltage transformer is preferably accommodated in the control room. A cable leadthrough or a connection on the outside of the container therefore makes it possible to connect an external power supply that requires no particular specification to the container. The voltage transformer consequently allows the operation on different platforms with different electrical infrastructures. The voltage transformer installed into the container ensures that the other electric and electronic components within the container receive the respectively required voltages. Consequently, the container and, in particular, its installations can be operated on various types of ships with different onboard power supply systems. It is even possible to use the inventive container and to operate the towed array sonar system on a ship or a platform that does not feature its own power supply such as, e.g., a sailboat; to this end, it would merely be required to connect an external power generator to the container.

Other advantageous embodiments result from the dependent claims, as well as the exemplary embodiments that are described in greater detail below with reference to the drawings.

BRIEF DESCRIPTION OF THE DRAWINGS

FIG. 2 shows a side view of a towed array sonar system according to FIG. 1 that is set up on a helicopter deck of a ship.

FIG. 4 shows a towed array sonar system according to FIG. 1 at a first operating site aboard a container ship.

DETAILED DESCRIPTION OF THE INVENTION

Figure 1:
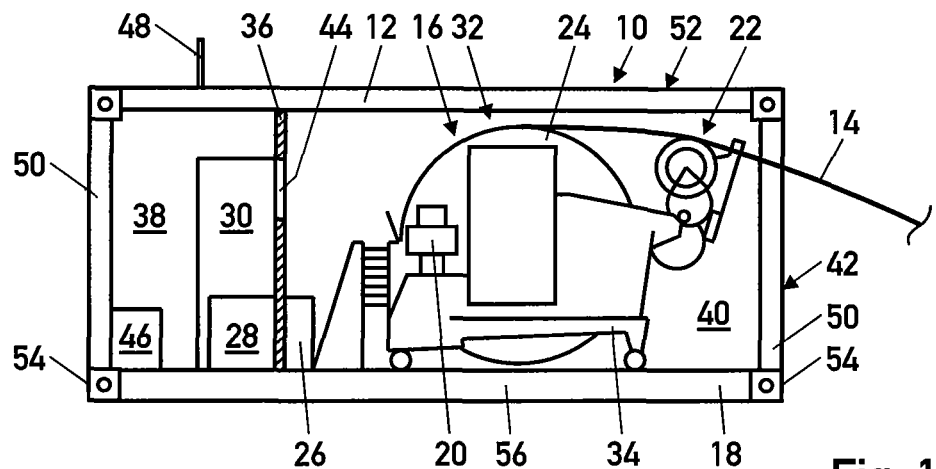
FIG. 1 shows a sectional representation of an exemplary embodiment of an inventive towed array sonar system in a container.

FIG. 1 shows a mobile, transportable towed array sonar system that is installed in a container 12, particularly an ocean container that can be closed on all sides in a waterproof fashion. This container 12 serves as a control station, as well as a storage space for the towed array sonar system 10. All essential devices required for the operation of towed array sonar system are installed within the container. In addition to the towed array 14, a winch 16 is mounted in the container 12 on a bottom frame construction designed, in particular, for absorbing high tensile forces and traction torques that are introduced into the container 12 and the bottom frame construction 18 via the winch 16 when the towed array 14 is deployed. The winch 16 contains an electric drive 20, as well as a guide carriage 22 for guiding the towed array 14, particularly while the towed array 14 is retrieved and rolled up on the winch drum 24, but also while unrolling the towed array 14 during the deployment of the towed array 14 into the surrounding body of water.

Furthermore, a voltage transformer 26 installed within the container 12 transforms different electric input voltages into one or more predefined electric output voltages. Consequently, the towed array sonar system 10 can be operated on various types of ships with different onboard power supply systems. The voltage transformer 26 provides an electric output voltage for the electric drive 20, as well as the same or a different electric output voltage for a signal processing device 28 that is also installed in the container 12.

The signal processing device 28 receives signals from the acoustically active section of the towed array 14 that features electro-acoustic and/or optoacoustic transducers, namely via an electrical or optical cable extending in the towed array 14. Since the towed array 14 also comprises a towing cable in addition to the acoustically active section, this towing cable not only consists of a steel cable that can be subjected to high tensile forces, but also electrical lines and, if applicable, optical waveguides. A signal preprocessing preferably already takes place in the acoustically active section of the towed array 14. This allows an analog-digital conversion of the electric signals generated by the electro-acoustic transducers.

The signal processing device 28 processes the signals received from the towed array into sonar data in order to provide a situation report on the surrounding body of water.

Furthermore, a control console 30 for controlling the winch is provided within the container 12 along with other components that are collectively referred to as deployment device 32 below. In addition to the winch 16 and the guide carriage 22, the deployment device 32 comprises other mechanical components for deploying and retrieving the towed array 14, as well as a winch frame 34 and the electric drive 20. The control console 30 makes it possible to control the entire deployment and retrieval process of the towed array 14, as well as the operation of the towed array sonar system including the visual display of sonar data, in particular, on a monitor.

The container 12 is split into a control room 38 and a winch compartment 40 by means of a partition wall 36, wherein the control room 38 is or can be hermetically sealed relative to the surroundings and accommodates the signal processing device 28 and the control console 30. The winch compartment 40 features a door 42 that is preferably realized in the form of a double-wing container door on the stern side. This door 42 is opened before the towed array 14 is deployed and remains open while a sonar mission is carried out, wherein said door is once again closed after the sonar mission has been completed and the towed array 14 has been retrieved. It is therefore unnecessary to hermetically seal the winch compartment 40.

The control room 38 features a (not-shown) access door. Accordingly, the winch compartment 40 also features a (not-shown) access door. The control room 38 furthermore features an emergency exit such that the personnel can escape from the container 12 in case the access door to the control room is blocked.

The control room furthermore features a window 44 to the winch compartment 40 such that an operator in the control room 38 can monitor the operation of the deployment device 32 and the sonar mission through this window 44. In addition, observation cameras for monitoring areas that are not visible through the window 44 along with lighting means for illuminating these areas, as well as the entire winch compartment and the region in front of the container door, are provided in the winch compartment 40.

The control room 38 is preferably thermally insulated, i.e., it features heat insulation on its walls, as well as on the ceiling and on the floor. The control room 38 furthermore features a heating system 46, fire extinguishing means, first aid means, a satellite telephone system and communication devices for communicating with devices aboard the ship accommodating the container and/or with devices outside this ship. The container 12 therefore is equipped with one or more detachable antennas 48 that are preferably arranged on the roof above the control room 38.

The container furthermore comprises an emergency power supply in order to also supply the electric components, particularly the electronic components, with electric energy in case the electric energy supply fails.

In addition, the container 12 comprises a satellite navigation system or a satellite positioning system. It is furthermore preferred to provide an AIS, i.e., an automatic identification system, by means of which data of other watercraft with respect to their position and identification can be received and the own position and identification data can be transmitted to other watercraft.

The container shown therefore comprises all devices required for the operation of a towed array sonar system 10 that can be operated, particularly controlled, from this container 12.

A towed array sonar system of this type can be incorporated into a comprehensive reconnaissance system via suitable interfaces, namely either wire-bound interfaces or wireless interfaces. The towed array sonar system 10 may likewise receive reconnaissance data of other reconnaissance systems such as radar systems, infrared detection systems, satellite monitoring systems and/or optical monitoring systems and process this reconnaissance data together with the sonar data obtained by means of the towed array 14 in order to realize the most complete reconnaissance possible within a sea area.

The container 12 shown is based on a standard 20-foot or 40-foot ocean container (container according to ISO 668). It therefore has a skeletal structure that comprises four corner columns 50, a roof frame 52 and the bottom frame construction 18. The corner columns 50 are rigidly connected to the roof frame 52 and the bottom frame construction 18. The bottom frame construction 18 features a supporting frame, wherein the deployment device 32 or the winch frame 34 of the winch 16 is mounted within the container 12 on this supporting frame, and wherein the supporting frame features lashing means for lashing down the container 12 on a ship or another floating or land-based platform, e.g., in the region of harbor facilities. Since a deployed towed array 14 and, in particular, the retrieval of the towed array 14 exert high tensile forces upon the winch, the container 12 needs to be horizontally fixed on its surroundings such that it is not pulled into the surrounding body of water. The aforementioned lashing means therefore are advantageously designed, in particular, for absorbing horizontally acting forces.

According to a special exemplary embodiment, the bottom frame construction 18 features an additional floor frame above the aforementioned supporting frame, wherein this additional floor frame is welded to the supporting frame and comprises four corner fittings, two longitudinal beams and two crossbeams, and wherein these corner fittings respectively are rigidly connected to one of the corner columns 50 with one end. In this exemplary embodiment, a conventional ocean container was placed onto the supporting frame and rigidly welded thereto such that the winch or the winch frame is not directly connected to the relatively weak components of a conventional ocean container, but rather a much more stable construction, namely the supporting frame. This exemplary embodiment makes it possible to utilize a cost-efficient standard ocean container that actually is not suitable for absorbing high tensile forces via installations located within the container.

The aforementioned supporting frame features four corner fittings 54 on its corners, as well as two longitudinal supporting frame beams 56 that are rigidly connected to these corner fittings 54 and two supporting frame crossbeams that are rigidly connected to these corner fittings 54. The aforementioned lashing means are provided on one or both longitudinal supporting frame beams 56 and/or on one or both supporting frame crossbeams between one or more pairs of adjacent corner fittings of the supporting frame.

According to an advantageous exemplary embodiment, the supporting frame features cross-pieces that are arranged between and rigidly connected, particularly welded, to the longitudinal supporting frame beams 56 and on which the winch frame 34 is mounted.

The supporting frame features one or more floor plates for shielding the interior of the container 12 relative to the bottom surroundings, wherein these floor plates feature one or more draining means, particularly drain plugs, drain flaps and/or bilge pumps. This ensures that admitted sea water or rain water, as well as condensation water, can be drained without any difficulty. Sea water is entrained aboard and therefore into the container, particularly during the retrieval of the towed array 14. However, the aforementioned draining means make it possible to once again remove this water from the container 12 without any problems.

On its outer side, the container 12 features external grounding points, preferably on the bottom frame construction 18 and particularly on the supporting frame, in order to ground or force the container 12 to the same electric potential as the surroundings.

According to a special embodiment, the winch compartment 40 features an access door that is arranged on a side wall of the container, wherein the ocean container comprises a safety circuit that interrupts the power supply of the electric drive 20 of the winch 16 in the winch compartment 40 when the access door is opened and ensures the power supply of the electric drive 20 when the access door is closed. Consequently, persons entering the winch compartment 40 are not exposed to a hazard because the drive 20 of the winch 16 stops automatically when the access door to the winch compartment 40 is opened. The safety circuit therefore improves the occupational safety during the operation of the towed array sonar system 10.

The winch 16 is equipped with a mechanical locking brake that prevents the towed array 14 from uncontrollably unrolling in case the electric energy supply fails. In addition, the winch can also be stopped when the towed array is deployed to any desired length without requiring additional electric energy after the stopping maneuver.

According to another exemplary embodiment, the winch 16 features an impulse transmitter for determining the deployed length of the cable and of the towed array, as well as a winch control that is designed such that a minimum number of towing cable windings, e.g., at least three windings, remain on the winch drum 24 during the operation of the winch. Such a minimum number of windings ensure a tension relief in the region of the winch drum 24.

According to another advantageous exemplary embodiment, the winch 16 features a slip ring for transmitting electrical and/or optical signals. This is advantageous because the towed array 14 requires an electric energy supply for supplying the electro-acoustic and/or opto-acoustic transducers, as well as for already realizing a signal conditioning within the towed array 14, and the thusly generated sensor signals can be transmitted from the towed array 14 into the signal processing device 28 of the towed array sonar system 10. This transmission preferably takes place by means of electrical and/or optical signals. The aforementioned slip ring makes it possible to transmit these signals.

FIG. 2 shows the arrangement of a container 12 according to FIG. 1 on a stern deck 60, e.g., a helicopter deck of a ship 58. Such a deck is usually not designed for accommodating containers that are subjected to tensile loads and acted upon by horizontal forces. Due to the aforementioned lashing means on the supporting frame of the container 12, these horizontal forces can be absorbed by the ship construction, particularly in the region of the aforementioned deck 60.

FIG. 2 furthermore shows the towed array, wherein a section adjacent to the container 12 consists of a towing cable 62 that may have a length of several hundred meters. The acoustically active section 64 containing the electroacoustic or optoacoustic transducers and, if applicable, a signal preprocessing device is connected to the towing cable 62, preferably via an intermediately arranged damping section. An end section 66 for aligning and stabilizing the position of the towed array is connected to the end of the towed array 14, preferably also via an intermediately arranged damping section.

Figure 3:
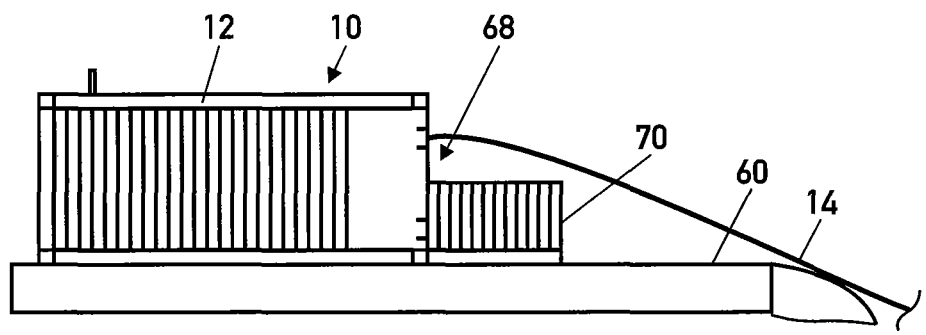
FIG. 3 shows an enlarged representation of the towed array sonar system according to FIG. 2.

FIG. 3 shows an enlarged view of the situation according to FIG. 2. The container 12 is positioned at the end of the deck 60 and its door 42 is open. The towed array 14 is deployed from the container into the surroundings through the door opening 68 and then into the surrounding body of water. The region around the door opening 68 is secured with protective barriers 70 such that no unauthorized persons can be accidentally admitted into the region of the towed array.

FIG. 4 shows the positioning of an inventive container 12 on a container ship 72, wherein the container 12 accommodating the towed array sonar system 10 was placed on the container ship at a corner in the last row. According to FIG. 4, this container 12 is located aboard the container ship 72.

Figure 5:
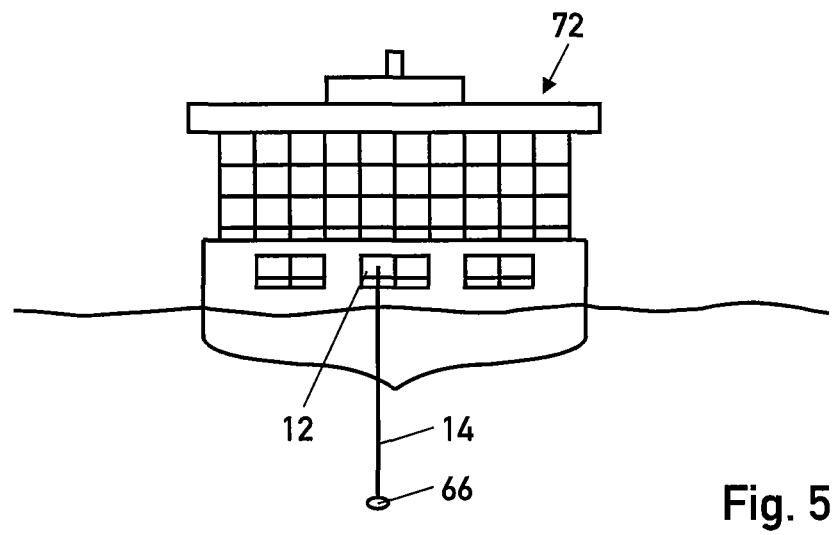
FIG. 5 shows a towed array sonar system according to FIG. 1 at a second operating site aboard a container ship.

FIG. 5 shows another exemplary embodiment for setting up a container 12 that accommodates a towed array sonar system 10 below deck, wherein the position, i.e., the operating site, was chosen such that an opening in the hull is located in the region of the door 42 of the container 12 and the towed array 14 can be deployed into the surrounding body of water through this opening.

All characteristics disclosed in the preceding description of the figures, the claims and the introduction of the description can be used individually, as well as in any combination. Consequently, the disclosure of the invention is not limited to the described or claimed combinations of characteristics. On the contrary, all combinations of characteristics should be considered as being disclosed.

What is claimed is:

1. A towed array sonar system (10) with a towed array (14), a deployment device (32) for respectively deploying and retrieving the towed array (14) into and from a body of water, a signal processing device (28) for processing the signals of the towed array (14) and at least one control console (30) for controlling the towed array sonar system (10), wherein the towed array (14), the deployment device (32), the signal processing device (28) and the control console (30) are installed in a single container (12) that can be transported independently of a ship and the towed array sonar system (10) can be operated from this single container (12)(10), wherein the container (12) comprises a bottom frame construction (18) which features a supporting frame, wherein the deployment device (32) is mounted within the single container (12) on this supporting frame, and the supporting frame includes a lashing portion for lashing down the single container (12) on a ship or another floating or land-based platform and configured to absorb horizontally acting forces during the deployment or during the deploying of the towed array (14) or retrieving of the towed array (14).

2. The towed array sonar system (10) according to claim 1, wherein the towed array (14) is heavier than water.

3. The towed array sonar system (10) according to claim 1 wherein an acoustically active section (64) of the towed array (14) features means for attaching anchoring devices that serve for anchoring this section on the bottom of a body of water on its ends.

4. The towed array sonar system (10) according to claim 1, wherein the single container (12) features a radio communication device for transmitting sonar data from the towed array sonar system (10) to a command post outside the single container (12) and/or for receiving control data for the towed array sonar system (10) from the command post.

5. The towed array sonar system (10) according to claim 1, wherein the container (12) has an interior that is split into a control room (38) and a winch compartment (40) by a partition wall (36), wherein the control room (38) is or can be hermetically sealed relative to the surroundings and contains the signal processing device (28) and the control console (30), and wherein the winch compartment (40) contains the deployment device (32) that comprises a winch (16).

6. The towed array sonar system (10) according to claim 5, wherein the control room (38) features an access door, an emergency exit, a window (44) to the winch compartment (40), an air-conditioning system, a heat insulation for thermally insulating the control room (38) relative to the surroundings, a heating system, fire extinguishing means, first aid means, a satellite telephone system, communication devices for communicating with devices aboard the ship (58) accommodating the single container (12) and/or with devices outside this ship (58), an emergency power supply, a satellite navigation system and/or an automatic identification system.

7. The towed array sonar system (10) according to claim 1, wherein it features a voltage transformer (26) that is installed in the single container (12) and serves for providing a predefined or predefinable output voltage at a variable input voltage.

8. A method for carrying out a sonar mission by a towed array sonar system (10) according to claim 1, comprising the steps of:
 a) transporting the towed array sonar system (10) to an operating site,
 b) deploying the towed array (14) from the single container (12) into a body of water by means of the deployment device (32),
 c) controlling a sonar mission by means of the control console (30) within the single container (12), and
 d) retrieving the towed array (14) from the body of water into the single container (12) after the completion of the sonar mission.

9. The method according to claim 8, comprising the additional step of transporting the towed array sonar system (10) to a new operating site or a storage site.

10. The method according to claim 8, wherein the operating site is a location on or below deck at the stern of a ship.

11. The method according to claim 8, wherein the operating site is a harbor installation.

12. The method according to claim 8, wherein the control console (30) transmits sonar data to a command post outside the single container (12) and/or receives control data from this command post.

13. The method according to claim 8, wherein the operating site is a ship and the sonar data is transmitted to another ship via radio.

14. The method according to claim 8, wherein sonar data of other sonar systems, particularly towed array sonar systems, radar data of radar systems or infrared detection data of infrared detection devices that are respectively arranged, in particular, aboard other ships or satellite monitoring data of satellite monitoring systems is or are transmitted to the control console (30) via radio.

* * * * *